April 23, 1940. J. L. ANDERSON 2,197,961
PIPE OR TUBE WELDING
Filed Aug. 6, 1936 2 Sheets-Sheet 1
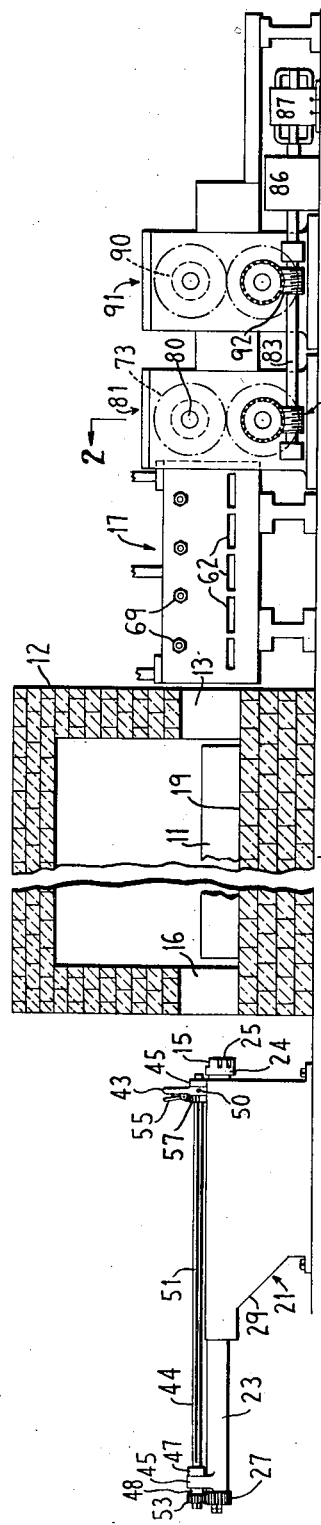
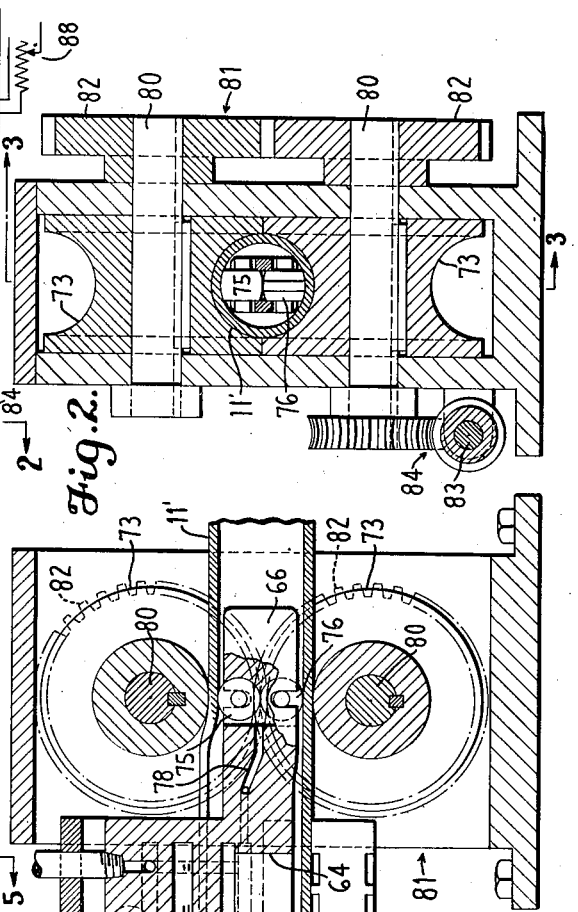
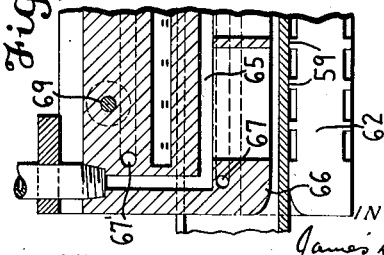
INVENTOR
James L. Anderson
BY
ATTORNEY April 23, 1940.  J. L. ANDERSON  2,197,961
PIPE OR TUBE WELDING
Filed Aug. 6, 1936  2 Sheets-Sheet 2
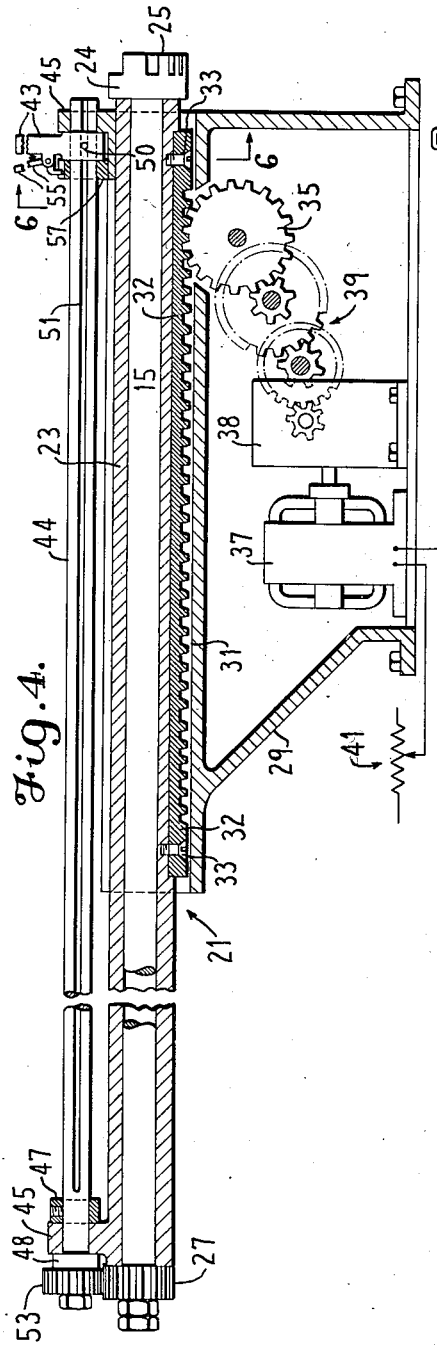
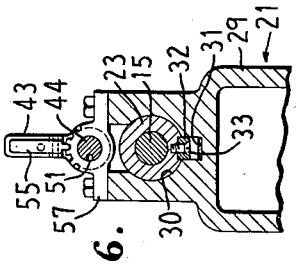
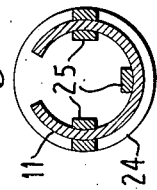
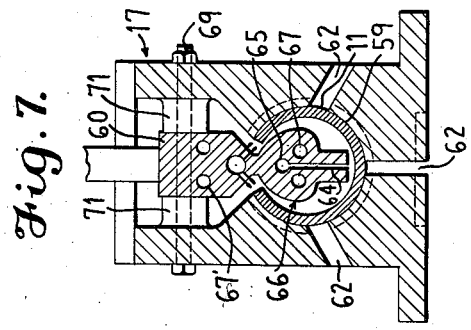
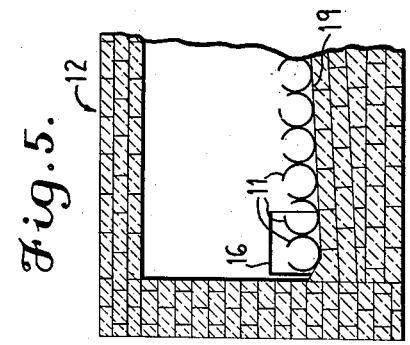
INVENTOR
James L. Anderson
BY
ATTORNEY Patented Apr. 23, 1940

2,197,961

UNITED STATES PATENT OFFICE 2,197,961

PIPE OR TUBE WELDING

James L. Anderson, Closter, N. J., assignor to Air Reduction Company, Incorporated, New York, N. Y., a corporation of New York Application August 6, 1936, Serial No. 94,549

5 Claims. (Cl. 113—112)

This invention relates to the making of welded pipes or tubes.

One of the most modern and highly successful methods of manufacturing pipe and tubing from flat skelp is by pulling the skelp through a retort in which high intensity flame jets are directed against the edge faces of the skelp to heat them to a welding condition, preferably a state of surface fusion, and immediately after the edge faces reach such a condition bending the skelp into a closed tube and bringing the edge faces together to make the weld. The heating of the edge faces may take place while the skelp is flat, or after it is partially formed, or at both times, and greater economy is obtained by heating the entire body of the skelp in a furnace before pulling the skelp through the retort.

In the design of the retorts and other apparatus for carrying out that method, however, it has been necessary to make provision for the passage of tongs by which the skelp is pulled from the furnace and into the retort, and such provision has put definite limitations on the construction of the apparatus.

It is an object of this invention to provide an improved method of making welded pipe and tubing with edge-heating retorts.

In accordance with one feature of the invention the skelp is partially formed before it is heated in the furnace, and the partially formed skelp is pushed through the retort and into the welding apparatus instead of being pulled, as in the prior art. In this way tongs are dispensed with, and the apparatus can be made with a mandrel and rollers inside of the partially formed skelp or tube where it passes through the retort and welding apparatus. Retort guide surfaces and roll stands for welding and sizing can be made without concessions for the passage of tongs.

In its broader aspects the invention is not limited to the manufacture of pipe and tubing with retorts having flame jets. Some features of the invention are applicable to any pipe or tube manufacture in which separate lengths of skelp must be introduced into heating or forming apparatus.

Other objects, features and advantages of the invention will appear or be pointed out as the specification proceeds.

In the accompanying drawings, forming part hereof:

Fig. 1 is a side elevation, with the furnace in section, showing apparatus for making tubes in accordance with this invention;

Fig. 2 is an enlarged sectional view taken along the line 2—2 of Fig. 1;

Fig. 3 is a sectional view on the line 3—3 of Fig. 2 and showing a longitudinal section of the retort;

Fig. 4 is an enlarged longitudinal sectional view of the plunger mechanism shown at one side of the furnace in Fig. 1;

Fig. 5 is an enlarged sectional view through the furnace, the section being taken along the line 5—5 of Fig. 1;

Fig. 6 is a sectional view on the line 6—6 of Fig. 4;

Fig. 7 is an enlarged transverse sectional view through the edge-heating retort with the partially formed skelp traveling through the retort; and Fig. 8 is a detail view illustrating how the jaws on the forward end of the plunger hold the pipe.

Partially formed tubes or skelps 11 are heated in a furnace 12. After being heated to the desired temperature, each partially formed skelp 11 is pushed out of the furnace through an exit opening 13. The partially formed skelp is pushed by a plunger 15 which enters the furnace through an opening 16 in the furnace wall opposite the exit opening 13. An edge-heating retort 17 is located just beyond the exit opening 13.

The furnace 12 contains a number of partially formed skelps 11 at the same time, and they rest on a sloping floor 19 which is lowest at the end between the openings 13 and 16. The partially formed skelps 11 are put into the furnace at the high end of the floor 19, and they lie side by side, as shown in Fig. 5. The pitch of the furnace floor is sufficient to cause the partially formed skelps 11 to slide or roll toward the low end of the floor every time the lowest skelp is ejected from the furnace.

Another advantage of having the skelp partially formed before heating it is that the bent skelp has much greater stiffness than flat skelp and will not buckle when pushed from one end to eject it from the furnace.

An ejector unit 21, which includes the plunger 15 and its operating mechanism, is shown in detail in Fig. 4. The plunger 15 is supported in a sleeve 23 and is rotatable in the sleeve as a bearing. A face plate 24 is secured to the forward end of the plunger 15 and has jaws 25 adapted to receive the rearward end of the partially formed skelp 11, as shown in Fig. 8. The plunger 15 is rotated, by means which will be described, to bring the jaws 25 into the position, with respect to the partially-formed tube 11, shown in Fig. 8. If the open portion of the partially formed skelp is toward the bottom, for example, the plunger will be rotated to turn the face plate 24 through a half revolution so that the middle one of the jaws 25 is opposite the open portion of the partially-formed skelp.

After the end of the partially-formed skelp 11 is held by the jaws 25 the plunger is rotated to bring the middle jaw 25 to the bottom so that each skelp ejected from the furnace has its longitudinal edges in the same uppermost positions when it enters the retort 17.

Referring again to Fig. 5, the plunger 15 has a gear 27 at the end remote from the face plate 24, and this gear and the face plate serve as thrust bearings to prevent endwise movement of the plunger 15 in the sleeve 23 and to compel the plunger to move as a unit with the sleeve when the latter is moved axially.

The sleeve 23 is supported by a frame 29, and is movable axially on a bearing 30 (Fig. 6) on the frame. The bearing 30 has a bottom groove 31. A rack 32 is fastened to the sleeve 23 by screws 33 and slides freely in the groove 31. The rack serves as a spline to prevent rotation of the sleeve 23. A gear 35 (Fig. 4) meshes with the rack 32, and rotation of the gear 35 in one direction or the other causes the plunger 15 to move forward or backward.

The gear 35 is driven from an electric motor 37 through worm reduction gearing 38 and a reducing gear train 39. The motor 37 and gearing 38, 39 are shown enclosed in the frame 29. The motor 37 is equipped with an adjustable speed control device 41. The speed is regulated to obtain the most advantageous rate of travel of the plunger 15 on its stroke into the furnace. That rate determines the speed with which each partially formed skelp 11 is pushed into and through the edge heating retort 17, and the speed must be determined in accordance with the degree of furnace heating, the thickness of the skelp, the intensity of the heating agencies in the retort, and the type of weld desired. The greater the amount of heat to be added in the retort 17, the slower the motor speed.

The plunger 15 is rotated by a handle 43 to initially bring the face plate 24 and jaws 25 into correct relation with the end of the partially formed skelp 11 and rotate the skelp into a position with the edges uppermost. The handle 43 is on a shaft 44 which rotates in bearings in lugs 45 at the top of the frame 29. Collars 47, 48 on the shaft 44 prevent the shaft from moving axially, but the shaft can rotate in its bearings unless prevented from doing so by the handle 43. The handle has a pin 50 extending into a groove 51 in the shaft 44 and comprising a slidable connection between the handle 43 and the shaft 44. A gear 53 fastened to the end of the shaft 44 meshes with the gear 27 and transmits rotary movement of the shaft 44 to the plunger 15.

The handle 43 is held in position by a bellcrank 55 pivotally connected to the handle and having a latch at one end which fits into the recesses between the teeth of a gear segment 57 attached to the frame 29.

The heating retort 17 is best shown in Figs. 3 and 7. The partially formed skelp 11 passes across grooved guide surfaces 59. A torch or block 60 has orifices in position to cause streams or jets of air, oxygen, or burning fuel gas to be applied directly to the edge faces of the partially formed skelp as it passes through the retort. The heating is preferably by oxyacetylene flames directed against the edge faces With such flame heating in the retort it is not necessary to raise the metal to such a high temperature in the furnace, the apparatus can be operated at higher speed, and the reducing envelope gases produced by the primary combustion purify the metal of the edge faces which later becomes the metal of the weld.

The grooves in the guide surfaces 59 have exhaust ports 62 for the escape of the gas which travels across the outside surface of the partially formed skelp. When using oxacetylene flame jets in the retort, the products of combustion, in traveling around the outside surface of the partially formed skelp to reach the exhaust ports 62, heat the metal back from the edge faces and reduce conduction losses from the edges.

Gas from the jets also passes into the interior of the partially formed tube, and this gas escapes through ports 64 which open into an exhaust conduit 65 in a mandrel 66 formed integral with the block 60. The mandrel 66 is cooled by water or other cooling medium flowing in cooling passages 67. Similar passages 67' for cooling liquid are provided in the block 60.

The block 60 is secured in the retort 17 by bolts 69. Bosses or spacers 71 hold the block in a central position and leave openings on both sides of the block for air to reach the jets when burning fuel gas is used to heat the skelp edges.

The mandrel 66 extends beyond the rearward end of the block 60 and into the pass between welding rolls 73. The retort guides the skelp into the pass between the rolls 73, and these rolls have semi-circular grooved faces for completing the forming of the skelp and for bringing the heated edge faces together to make a weld. The welded tube is designated by the reference character 11' in Figs. 2 and 3. The weld is rolled between the upper welding roll 73 and a roller 75 which is held against displacement lengthwise of the tube by the mandrel 66. The roller 75 is supported by a roller 76 running on the bottom of the tube. The rollers 75 and 76 are cooled by a small stream of water flowing through a conduit 78 from the cooling chamber 67.

The welding rolls 73 are keyed to axles 80, which turn in bearings in a roll stand 81. The axles 80 are connected by gears 82, and one of the axles is driven by a shaft 83 through worm gearing 84. The shaft 83 is driven through a reduction gear box 86 (Fig. 1) by a motor 87. The motor 87 has a rheostat 88 or other means for controlling the speed of the welding rolls.

Each partially-formed skelp 11 is longer than the retort 17 so that one end of the skelp comes into the bite of the rolls 73 before the other end enters the retort. The speed of the skelp through the retort is first determined by the rate at which the plunger 15 advances, but later by the speed of rotation of the rolls 73.

The speed with which the skelp moves through the retort must be controlled in accordance with the rate at which the retort heats the edge faces, and the temperature of the skelp when it is removed from the furnace. The rate of heating in the retort depends upon the kind of gas used and the amount. Oxyacetylene flames give an intense heat, and with such flames closely spaced throughout the length of the retort the skelp can travel at high speed.

The welded tube may travel through one or more sizing passes after leaving the welding rolls 73. Fig. 1 shows a single sizing pass comprising rolls 90 in a stand 91. The sizing rolls are driven from the shaft 83 through worm gearing 92 in the same manner as the welding rolls are driven from the shaft 83.

Other means for driving the rolls may be employed, and various other changes can be made in the illustrated embodiment of the invention.

I claim:

1. A method of making welded tubes by means of a retort including a heating instrumentality that projects a longitudinally extending system of heating jets directly against the edge faces of a partially-formed tube, and welding rolls which bring the edge faces together to make a weld, which method comprises intermittently moving successive lengths of partially-formed tube into the retort and past the heating jets with the edge faces spaced from one another and exposed to the direct impingement of the heating jets, effecting the initial movement of the partially-formed tube by pushing it at a speed so correlated with the intensity of the retort heating that the edge faces are brought to a welding condition during the time that they take to pass the heating jets, and propelling the tube during the time that its rearward portion is passing the heating jets by applying power to the welding rolls and rotating them at a speed which is also correlated with the intensity of said retort heating.

2. In the manufacture of welded tubes by heating skelp in a furnace and then heating the edges locally as the skelp is moved from the furnace to forming and welding rolls, the improvement which comprises heating separate lengths of skelp in a furnace with said skelp bent into partially-formed tubes, successively pushing each partially formed tube from the furnace before the metal reaches a welding condition and while it still retains considerable stiffness, turning each of the partially-formed tubes to bring the seam edges into a definite angular position around the circumference of the tube before ejecting the tube from the furnace, projecting a seamwise-extending system of heating jets against the seam edges of the tube as they come from the furnace in said angular position to effect rapid local heating of said seam edges, bringing the seam edges together in welding rolls just beyond the heating jets, propelling the tube first by the pushing force which ejects it from the furnace, and later by a pulling force produced by driving the welding rolls, both of said forces being applied at a speed which is so correlated with the seamwise extent and the intensity of the heating jets that the seam edges are heated to a welding condition by the time they reach said welding rolls.

3. The discontinuous method of making welded tubes by means of an edge-heating retort and closing apparatus which brings the heated edges together to make a weld, which method comprises recurrently introducing successive lengths of skelp into the edge-heating retort with said skelp only partially formed and a substantial spacing between the edges, moving each skelp into and through the retort with continuous motion by a force applied to the rearward end of the partially-formed skelp, maintaining the edges of the partially-formed skelp in a definite spaced relation while moving through the retort, heating the edges locally in said retort while controlling the speed at which the force is applied so as to make the skelp edges move through the retort at a rate which causes said edges to be heated to a welding condition by the time they reach the end of the retort, and completing the forming of the skelp and bringing the edges together progressively to make the weld immediately after the edges reach the end of said retort.

4. In the manufacture of welded tubes by heating partially-formed tubes in a furnace and rolling each of said tubes in the furnace to bring it into line with a discharge opening in the furnace, the improvement which comprises heating each partially-formed tube in the furnace to a temperature less than that required for welding so that the partially-formed tube retains its rigidity against compression forces exerted in the direction of its length, successively gripping each partially-formed tube in the furnace at the rearward end of said tube, rotating the tube to bring the seam edges to a predetermined angular position, maintaining the seam edges in such position while pushing the partially-formed tube from the furnace and into and through an edge-heating retort, projecting heating flames against the edge faces of the partially-formed tube with the edge faces spaced from one another and exposed to the direct impingement of the heating flames as said tube travels through the retort, completing the forming of the tube and pressing the seam edges together to make the weld by means of welding rolls at the discharge end of the retort, driving the welding rolls by power, and correlating the speed of the welding rolls, and that of the pushing force which removes the tubes from the furnace, with the rate of edge heating of the retort.

5. In the manufacture of welded tubes by heating separate lengths of partialy-formed skelp in a furnace and recurrently pushing the separate lengths of skelp from the furnace into forming and welding apparatus, the improvement which comprises turning each of the partially-formed skelps to bring the seam edges into a definite angular position around the circumference of the partially-formed skelp before ejecting the skelp from the furnace, of pushing each partially-formed skelp out of the furnace with the seam edges in said predetermined angular position, and before the skelp has been heated to a welding condition and while the metal still retains considerable stiffness, and heating the moving edges of the skelp locally along a substantial length of the run of skelp between the furnace and the forming and welding apparatus at a rate which raises the edges to a welding condition by the time said edges are brought together by the welding apparatus.

JAMES L. ANDERSON.